US010209603B2

United States Patent
Inoue et al.

(10) Patent No.: US 10,209,603 B2
(45) Date of Patent: Feb. 19, 2019

(54) SWITCHING OPTICAL ANTENNA, SWITCHING OPTICAL ANTENNA ARRAY, AND OPTICAL SCANNING DEVICE

(71) Applicant: KABUSHIKI KAISHA TOYOTA CHUO KENKYUSHO, Nagakute-shi, Aichi-ken (JP)

(72) Inventors: Daisuke Inoue, Nagakute (JP); Hiroyuki Matsubara, Nagakute (JP); Tadashi Ichikawa, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 15/704,693

(22) Filed: Sep. 14, 2017

(65) Prior Publication Data

US 2018/0088439 A1  Mar. 29, 2018

(30) Foreign Application Priority Data

Sep. 23, 2016  (JP) .................................. 2016-185875

(51) Int. Cl.
*G02F 1/295* (2006.01)
*G02F 1/29* (2006.01)

(52) U.S. Cl.
CPC ...... *G02F 1/2955* (2013.01); *G02F 2001/291* (2013.01); *G02F 2201/30* (2013.01); *G02F 2203/07* (2013.01); *G02F 2203/15* (2013.01); *G02F 2203/28* (2013.01)

(58) Field of Classification Search
None
See application file for complete search history.

(56) References Cited

U.S. PATENT DOCUMENTS

| 7,242,705 | B2 * | 7/2007 | Kneissl ................. B82Y 20/00 |
| | | | 372/50.11 |
| 9,684,222 | B2 * | 6/2017 | Lee ........................ G02F 1/2257 |
| 9,819,435 | B2 * | 11/2017 | Lipson .................... H04J 14/02 |
| 2010/0119229 | A1 | 5/2010 | Roelkens et al. |
| 2010/0187402 | A1 | 7/2010 | Hochberg et al. |
| 2010/0265504 | A1 | 10/2010 | Kopp et al. |
| 2012/0177060 | A1 * | 7/2012 | Lipson ............... G02B 6/12007 |
| | | | 370/464 |

(Continued)

FOREIGN PATENT DOCUMENTS

| JP | 2005-128442 A | 5/2005 |
| JP | 2010-524022 A | 7/2010 |

(Continued)

OTHER PUBLICATIONS

U.S. Appl. No. 15/490,283, filed Apr. 18, 2017 in the name of Daisuke Inoue.

(Continued)

*Primary Examiner* — Sung H Pak
(74) *Attorney, Agent, or Firm* — Oliff PLC

(57) ABSTRACT

A switching optical antenna that includes: a waveguide including a light input end and a light output end; a ring waveguide coupled with the waveguide through a first directional coupler; a diffraction grating that is disposed within the ring waveguide and that is coupled with the ring waveguide through a second directional coupler; and a refractive index adjusting section that changes a refractive index of at least a portion of the ring waveguide.

5 Claims, 8 Drawing Sheets

(56) References Cited

U.S. PATENT DOCUMENTS

2013/0279849 A1 10/2013 Santori et al.
2014/0192394 A1 7/2014 Sun et al.
2015/0168803 A1 6/2015 Xu et al.

FOREIGN PATENT DOCUMENTS

JP  2010-181426 A  8/2010
JP  2016-508235 A  3/2016

OTHER PUBLICATIONS

Sun et al. "Large-scale Nanophotonic Phased Array", Nature, vol. 493, pp. 195-199, 2013.
Oct. 30, 2018 Office Action issued in Japanese Patent Application No. 2016-185875.

* cited by examiner

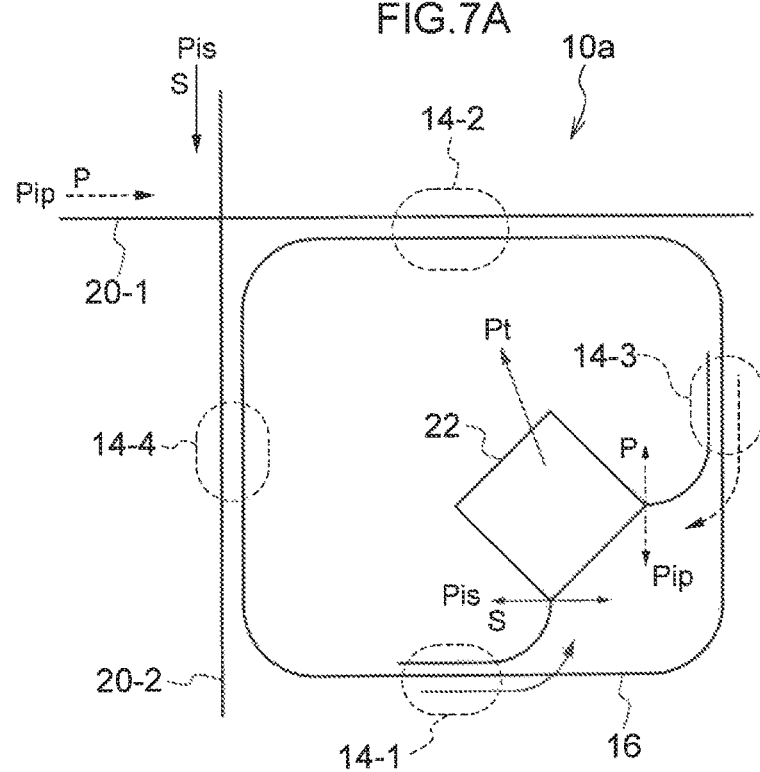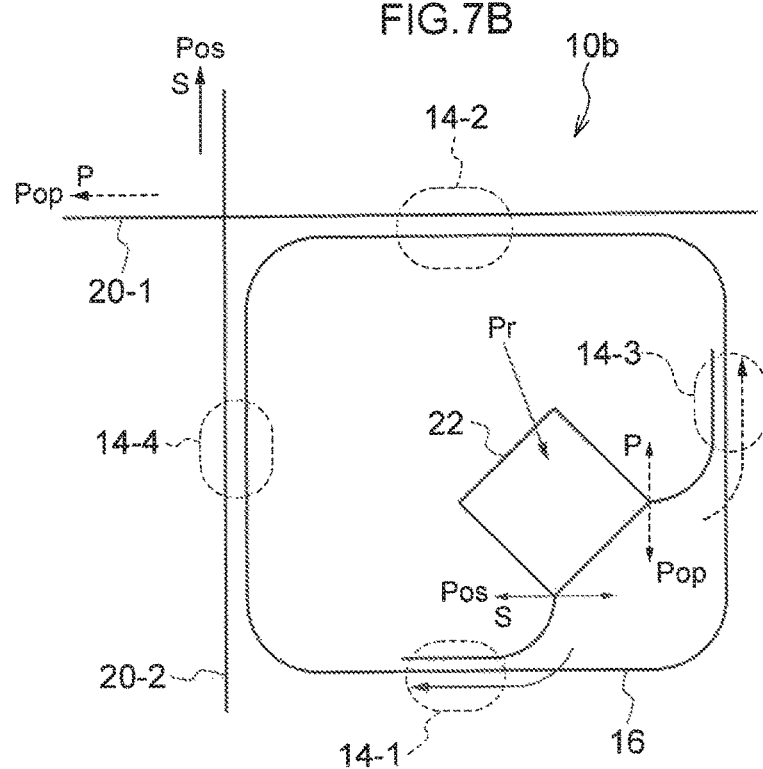

SWITCHING OPTICAL ANTENNA, SWITCHING OPTICAL ANTENNA ARRAY, AND OPTICAL SCANNING DEVICE

CROSS-REFERENCE TO RELATED APPLICATION

This application is based on and claims priority under 35 USC 119 from Japanese Patent Application No. 2016-185875 filed on Sep. 23, 2016, which is incorporated by reference herein.

BACKGROUND

Technical Field

The present invention relates to a switching optical antenna, a switching optical antenna array, and an optical scanning device.

Related Art

A switching optical antenna is a device that controls radiation and non-radiation (stoppage) of light, and is a key device for configuring a switching optical antenna array or an optical scanning device. One known form of an antenna that employs light is an optical phased array that combines a phase modulator with a diffraction grating, such as that described by Non-Patent Document 1 (Large-scale nanophotonic phased array, Nature, Vol. 493, p 195-199, 2013). The optical phased array described by Non-Patent Document 1 is configured such that a steering angle is changed by modulating the phase of light input to respective diffraction gratings disposed in an array arrangement.

However, when attempting to scan in two dimensions using a phased array antenna according to related technology such as that described in Non-Patent Document 1, the layout of optical lines and electrical wiring introduces limitations due to reasons such as a need to place separate electrodes at heaters. Accordingly, there have been fixed limits in the implementation of switching optical antenna arrays or optical scanning devices in which the switching optical antennas are arranged with high density.

SUMMARY

An aspect of a switching optical antenna of includes a waveguide including a light input end and a light output end, a ring waveguide coupled with the waveguide through a first directional coupler, a diffraction grating that is disposed within the ring waveguide and that is coupled with the ring waveguide through a second directional coupler, and a refractive index adjusting section that changes a refractive index of at least a portion of the ring waveguide.

BRIEF DESCRIPTION OF DRAWINGS

FIG. 7A and FIG. 7B are plan views illustrating examples of configurations of switching optical antennas according to a fourth exemplary embodiment.

DESCRIPTION OF EMBODIMENTS

Exemplary embodiments of the present invention will be described in detail below, with reference to the drawings.

First Exemplary Embodiment

Figure 1:
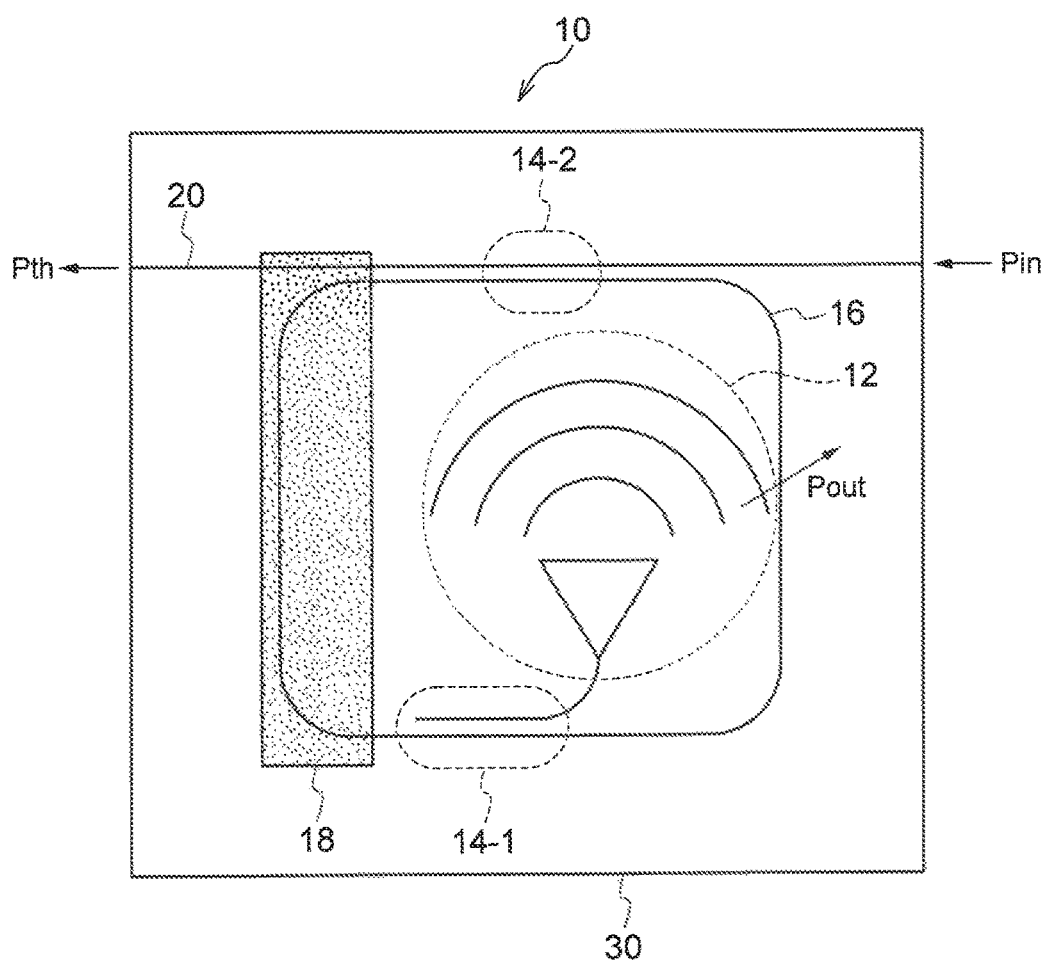
FIG. 1 is a plan view illustrating an example of a configuration of a switching optical antenna according to a first exemplary embodiment.

A switching optical antenna according to the present exemplary embodiment will be described with reference to FIG. 1. FIG. 1 illustrates a plan view of a switching optical antenna 10 according to the present exemplary embodiment.

As illustrated in FIG. 1, the switching optical antenna 10 includes a diffraction grating 12, a ring waveguide 16, directional couplers 14-1 and 14-2, a heater 18, and a waveguide 20. Further, the switching optical antenna 10 is integrated on a substrate 30 using optical waveguide technology.

The waveguide 20 is an optical waveguide having one end through which input light Pin is introduced, and having another end through which transmitted light Pth is output.

The ring waveguide 16 is an optical waveguide that is optically coupled with the waveguide 20 through the directional coupler 14-2.

The diffraction grating 12 is a site where light that has propagated to the diffraction grating 12 is radiated as output light Pout, and the diffraction grating 12 is disposed within the ring waveguide 16. The diffraction grating 12 is optically coupled with the ring waveguide 16 through the directional coupler 14-1. Namely, the diffraction grating 12 emits, as output light Pout, input light Pin introduced to the ring waveguide 16. The form of the diffraction grating 12 is not particularly limited; a tapered diffraction grating is employed as an example in the present exemplary embodiment.

The heater 18 is disposed on the ring waveguide 16, applies heat to a partial region of the ring waveguide 16, and changes the refractive index of the region using a thermo-optic effect.

In the switching optical antenna 10 configured as described above, a ring resonator-type ring switch is configured by the waveguide 20, the ring waveguide 16, the directional couplers 14-1 and 14-2, and the heater 18. Namely, the ring resonator is configured by the ring waveguide 16, and only light having a wavelength that meets a predetermined resonance condition based on the length of the ring waveguide 16 is able to travel around the ring waveguide. However, applying heat to a portion of the ring waveguide 16 using the heater 18 changes the refractive index of that portion and the equivalent optical path length of the ring waveguide changes.

Thus, using the heater 18 to apply heat to the ring waveguide 16 enables light having a specific wavelength, out of light introduced to the waveguide 20 as input light Pin, to be guided to the ring waveguide 16 via the directional coupler 14-2 and to be emitted from the diffraction grating 12 via the directional coupler 14-1. Note that light out of input light Pin that was not introduced to the ring waveguide 16 is guided outside from the waveguide 20 as transmitted light Pth.

As is clear from the above description, in the switching optical antenna 10, the diffraction grating 12, which has been disposed a separate unit hitherto, is disposed within the ring waveguide 16 such that the layout surface area of the diffraction grating 12 and the ring waveguide 16 is reduced. Namely, a layout surface area for just the ring waveguide 16 suffices, whereas a layout surface area for the diffraction grating 12 and the ring waveguide 16 was required hitherto.

Accordingly, the switching optical antenna 10 according to the present exemplary embodiment enables switching optical antennas to be arranged with a high density. Note that although the present exemplary embodiment describes an example of a form employing an optical switch in which the refractive index is changed using a thermo-optic effect, a form employing an optical switch in which the refractive index is changed by input of a current may be applied.

Second Exemplary Embodiment

Figure 2:
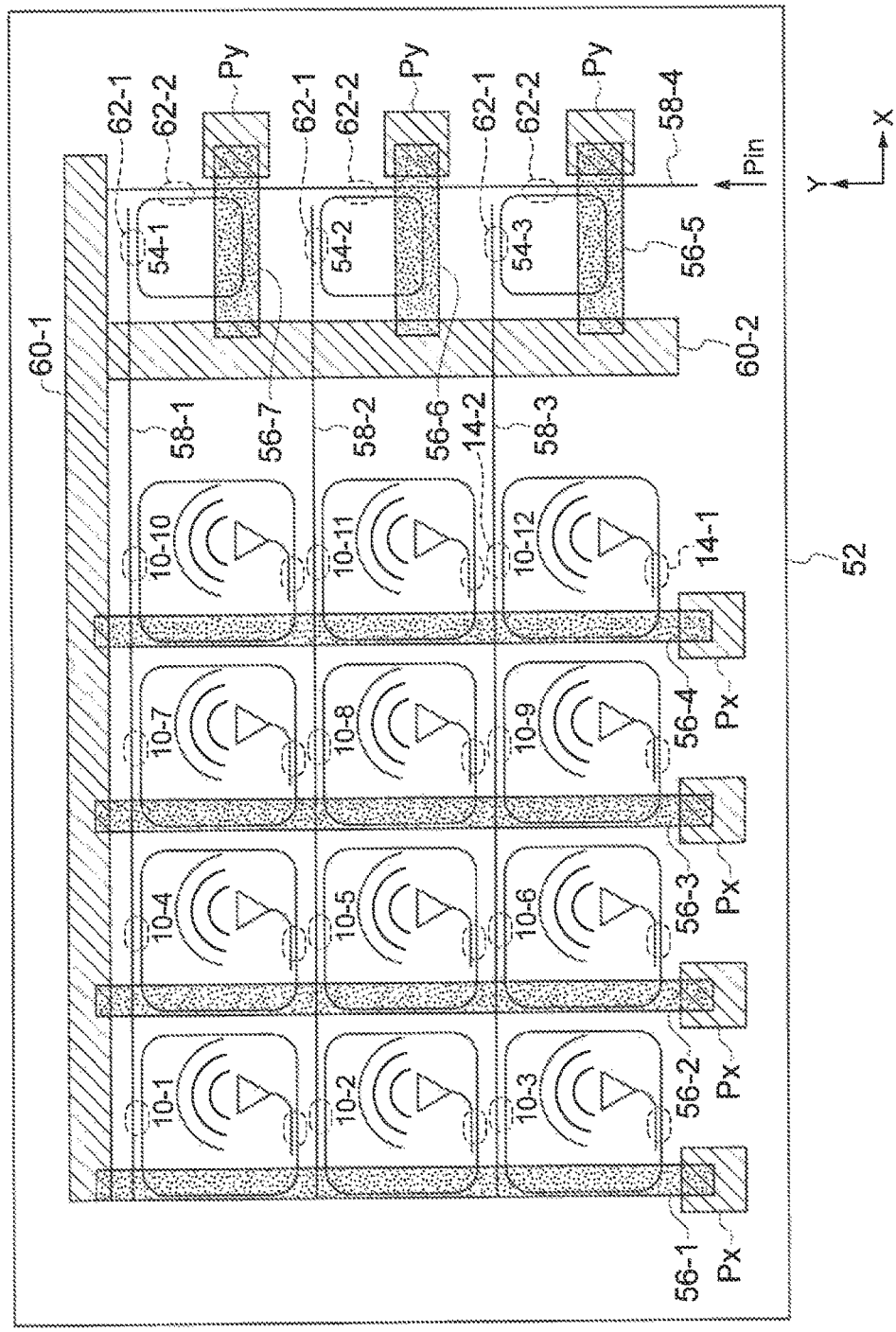
FIG. 2 is a plan view illustrating an example of a configuration of a switching optical antenna array according to a second exemplary embodiment.

A switching optical antenna array 50 according to the present exemplary embodiment will be described with reference to FIG. 2. FIG. 2 illustrates a plan view of the switching optical antenna array 50. The switching optical antenna array 50 is configured by disposing plural units of the switching optical antenna. 10 according to the exemplary embodiment above (an example in which there are 12 units is illustrated in FIG. 2).

As illustrated in FIG. 2, the configuration includes switching optical antennas 10-1, 10-2, 10-3, 10-4, 10-5, 10-6, 10-7, 10-8, 10-9, 10-10, 10-11, and 10-12 that are all switching optical antennas 10, ring waveguides 54-1, 54-2, and 54-3, heaters 56-1, 56-2, 56-3, 56-4, 56-5, 56-6, and 56-7, waveguides 58-1, 58-2, 58-3, and 58-4, and wirings 60-1 and 60-2. Each configuration site configuring the switching optical antenna array 50 above is integrated on a substrate 52 using optical waveguide technology.

The waveguide 58-4 is an incidence optical waveguide having one end through which input light Pin is input, and having another end extending in the Y direction on the coordinate axis as illustrated in FIG. 2. The ring waveguides 54-1, 54-2, and 54-3 are each coupled with the waveguide 58-4 through directional couplers 62-2.

The heater 56-7 is provided to the ring waveguide 54-1, the heater 56-6 is provided to the ring waveguide 54-2, and the heater 56-5 is provided to the ring waveguide 54-3. The heaters 56-5, 56-6, and 56-7 each have one end connected to the wiring 60-2, which is common wiring, and the heaters 56-5, 56-6, and 56-7 each have another end connected to a respective pad Py. The pads Py are external connection terminals. Further, the wiring 60-2 is formed by a metal thin film as an example.

The waveguides 58-1, 58-2, and 58-3 each have one end disposed in the vicinity of the waveguide 58-4, and each have another end extending in the −X direction. The switching optical antennas 10-1, 10-4, 10-7, and 10-10 are each coupled with the waveguide 58-1 through the directional couplers 14-2 (see FIG. 1). Similarly, the switching optical antennas 10-2, 10-5, 10-8, and 10-11 are each coupled with the waveguide 58-2 through the directional couplers 14-2, and the switching optical antennas 10-3, 10-6, 10-9, and 10-12 are each coupled with the waveguide 58-3 through the directional couplers 14-2.

The heater 56-1 is disposed commonly at the switching optical antennas 10-1, 10-2, and 10-3, the heater 56-2 is disposed commonly at the switching optical antennas 10-4, 10-5, and 10-6, the heater 56-3 is disposed commonly at the switching optical antennas 10-7, 10-8, and 10-9, and the heater 56-4 is disposed commonly at the switching optical antennas 10-10, 10-11, and 10-12. The heaters 56-1, 56-2, 56-3, and 56-4 each have one end connected to the wiring 60-1, which is common wiring, and each have another end connected to a pad Px. The pads Px are external connection terminals. Further, the wiring 60-1 is formed from a metal thin film as an example.

In the switching optical antenna array 50 having the above configuration, controlling the propagation of input light Pin incident from the waveguide 58-4 in a row direction (the X direction) and a column direction (the Y direction) enables output light Pout to be selectively emitted from each of the switching optical antennas 10-1 to 10-12.

First, control of propagation of light in the row direction will be described. Coupling and non-coupling with the waveguide 58-1 is controlled by the ring waveguide 54-1, the heater 56-7, and the directional couplers 62-2 and 62-1. Namely, coupling and non-coupling of input light Pin propagating through the waveguide 58-4 with the waveguide 58-1 is controlled by adjusting the heater 56-7. Similarly, coupling and non-coupling with the waveguide 58-2 is controlled by the ring waveguide 54-2, the heater 56-6, and the directional couplers 62-2 and 62-1, and coupling and non-coupling with the waveguide 58-3 is controlled by the ring waveguide 54-3, the heater 56-5, and the directional couplers 62-2 and 62-1. Hereafter, a configuration that controls propagation of light in the row direction using the ring waveguides 54-1, 54-2, and 54-3 is referred to as an "X light multiplexer".

Next, control of propagation of light in the column direction will be described. When considering the portion that includes the switching optical antennas 10-1, 10-2, and 10-3, propagated light that has been propagated through any of the waveguides 58-1, 58-2, and 58-3 (possibly through plural thereof) by the X light multiplexer is emitted from one of the switching optical antennas 10-1, 10-2, and 10-3 (possibly from plural thereof) by adjusting the heater 56-1. Similarly, propagated light that has been propagated through any of the waveguides 58-1, 58-2, or 58-3 is emitted from one of the switching optical antennas 10-4, 10-5, or 10-6 by adjusting the heater 56-2, propagated light that has been propagated through any of the waveguides 58-1, 58-2, or 58-3 is emitted from one of the switching optical antennas 10-7, 10-8, or 10-9 by adjusting the heater 56-3, and propagated light that has been propagated through any of the waveguides 58-1, 58-2, or 58-3 is emitted from one of the switching optical antennas 10-10, 10-11, or 10-12 by adjusting the heater 56-4. Hereafter, configuration that controls propagation of light in the column direction using each of the heaters 56-1, 56-2, 56-3, and 56-4 is referred to as a "Y light multiplexer". Namely, four Y light multiplexers are disposed in the example illustrated in FIG. 2.

In the switching optical antenna array 50 configured in the above manner, the common wirings 60-1 and 60-2 are used as wiring that controls the heaters, and separate wiring need not be provided for each individual optical switch, enabling the scale of optical lines and electrical wiring to be reduced and enabling easy arrangement in two dimensions. Furthermore, the switching optical antennas 10 are used as individual optical antennas that configure the switching optical antenna array 50, enabling implementation of a switching optical antenna array in which arranging with high density is possible.

Third Exemplary Embodiment

Figure 3:
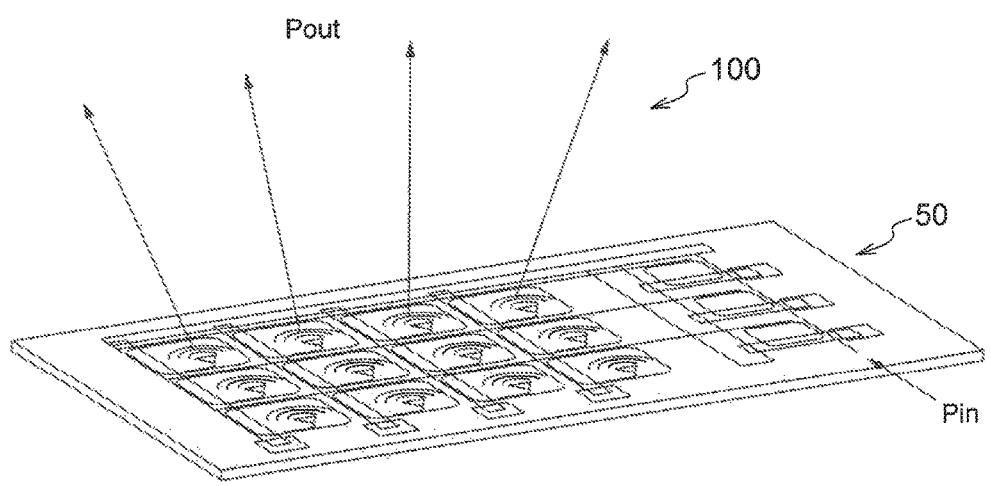
FIG. 3 is a perspective view illustrating an example of a configuration of an optical scanning device according to a third exemplary embodiment.

An optical scanning device according to the present exemplary embodiment will be described with reference to FIG. 3. FIG. 3 illustrates a perspective view of an optical scanning device 100 according to the present exemplary embodiment.

As illustrated in FIG. 3, the optical scanning device 100 is configured including a light source (omitted from illustration) that generates input light Pin and the switching optical antenna array 50 according to the exemplary embodiment above. Input light Pin that was incident to the switching optical antenna array 50 is output as output light Pout from one of the switching optical antennas 10-1 to 10-12 by controlling as described above. When this occurs, output light Pout can be scanned in two dimensions by varying the directionalities of the diffraction grating 12 included in each of the switching optical antennas 10-1 to 10-12. The directionality of the diffraction grating 12 can, for example, be varied by changing the pitch or angle of slits provided to the diffraction grating 12.

First Modified Example of Third Exemplary Embodiment

An optical scanning device 100a according to the present exemplary embodiment will be described with reference to FIG. 4A and FIG. 4B. The optical scanning device 100a has a form in which a lens 102 is provided to the optical scanning device 100 described above. The lens 102 is disposed above the switching optical antennas 10-1 to 10-12 disposed in the switching optical antenna array 50.

Figure 4A:
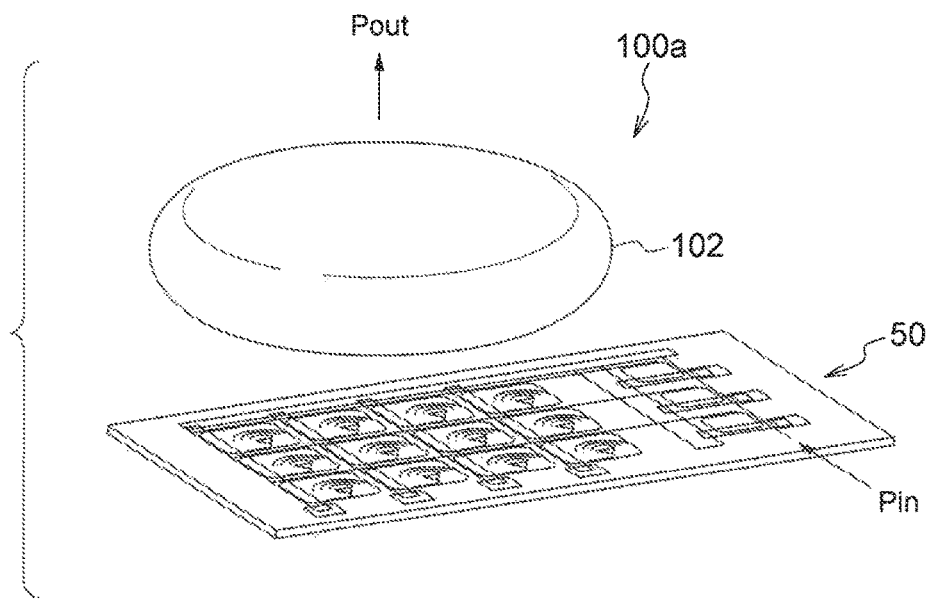
FIG. 4A and FIG. 4B are perspective views illustrating an example of a configuration of an optical scanning device according to a first modified example of the third exemplary embodiment.
Figure 4B:
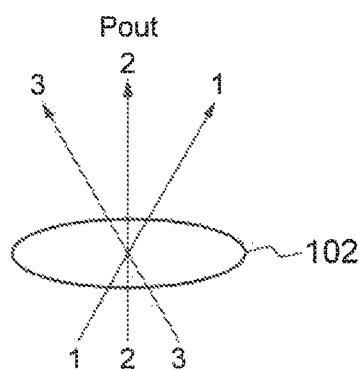

As illustrated in FIG. 4A, input light Pin input to the switching optical antenna array 50 is emitted from one of the switching optical antennas 10-1 to 10-12 by controlling as described above, and is output as output light Pout via the lens 102. As is clear from the principles diagram illustrated in FIG. 4B, in the optical scanning device 100a according to the present exemplary embodiment, sharp directionality is achieved by a small chip.

Second Modified Example of Third Exemplary Embodiment

Figure 5A:
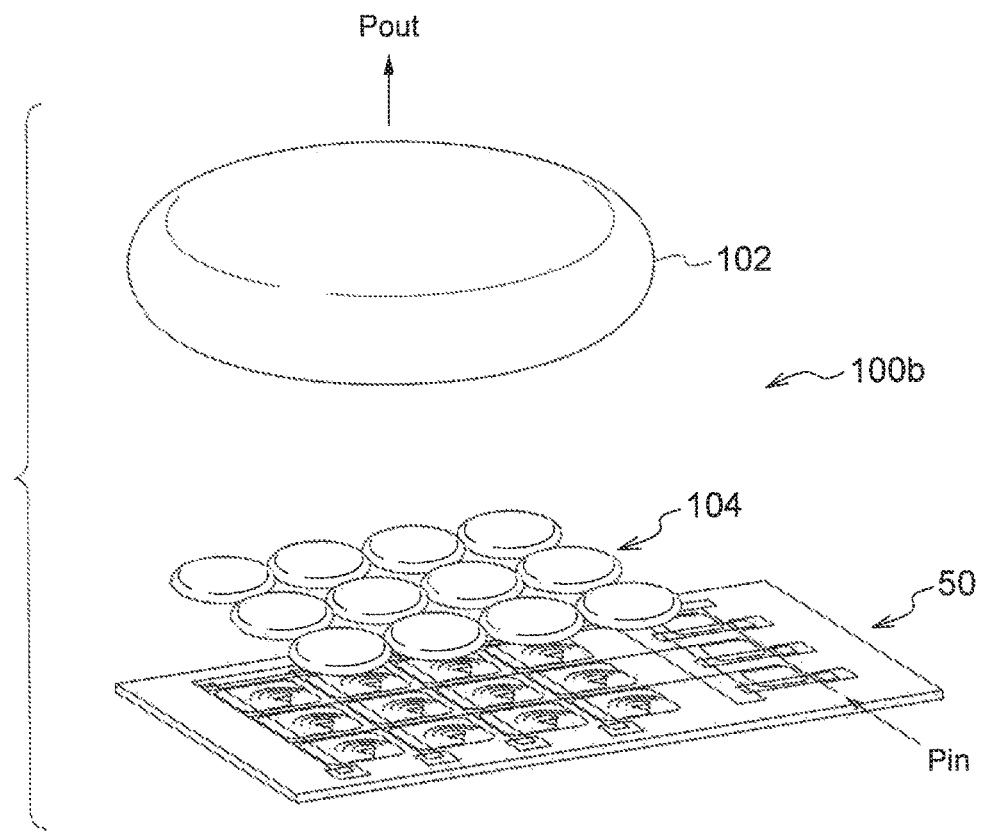
FIG. 5A and FIG. 5B are perspective views illustrating an example of a configuration of an optical scanning device according to a second modified example of the third exemplary embodiment.
Figure 5B:
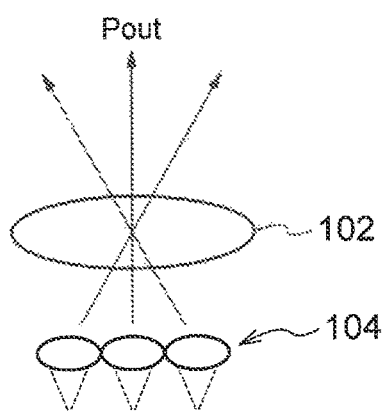

An optical scanning device 100b according to the present exemplary embodiment will be described with reference to FIG. 5A and FIG. 5B. The optical scanning device 100b has a form in which a microlens array 104 is added to the optical scanning device 100a according to the exemplary embodiment described above. As illustrated in FIG. 5A, the individual lenses of the microlens array 104 are respectively disposed above the switching optical antennas 10-1 to 10-12 disposed in the switching optical antenna array 50.

As illustrated in FIG. 5A, input light Pin input to the switching optical antenna array 50 is emitted from one of the switching optical antennas 10-1 to 10-12 by controlling as described above, and is output as output light Pout via the microlens array 104 and the lens 102. As illustrated in FIG. 2, in the switching optical antenna array 50, there are spaces for the wirings 60-1 etc. and for the waveguides 58-1 etc., resulting in gaps caused by these spaces being formed in the output light Pout. In the optical scanning device 100b according to the present exemplary embodiment, as illustrated in FIG. 5B, configuration is such that the microlens array 104 performs preliminary collimation and gaps are eliminated. Accordingly, in the optical scanning device 100b according to the present exemplary embodiment, the beam divergence angle is lessened, directionality is narrowed, and output light Pout with no gaps is obtained. Note that in the optical scanning device 100b, the lens 102 may be omitted.

Third Modified Example of Third Exemplary Embodiment

A optical scanning device 100c according to the present exemplary embodiment will be described with reference to FIG. 6A and FIG. 6B. The optical scanning device 100c has a form in which the microlens array 104 has been added to the optical scanning device 100 according to the exemplary embodiment described above, and the pitch of the lenses configuring the microlens array 104 differs from that in the optical scanning device 100b according to the exemplary embodiment described above.

Figure 6A:
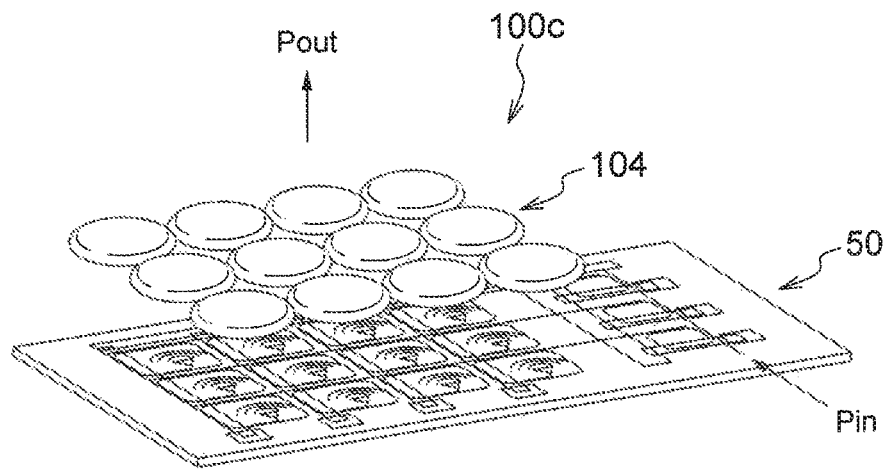
FIG. 6A and FIG. 6B are perspective views illustrating an example of a configuration of an optical scanning device according to a third modified example of the third exemplary embodiment.
Figure 6B:
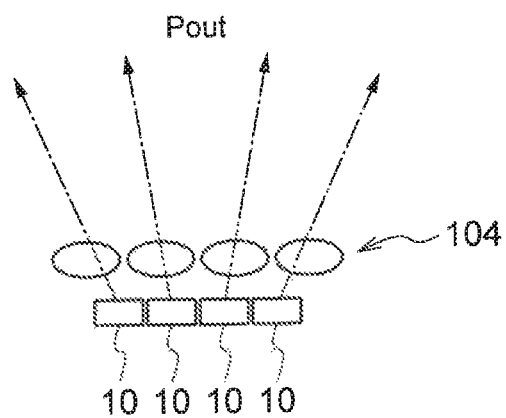

As illustrated in FIG. 6A, input light Pin input to the switching optical antenna array 50 is emitted from one of the switching optical antennas 10-1 to 10-12 by controlling as described above, and is output as output light Pout via the microlens array 104. As illustrated in FIG. 6B, in the optical scanning device 100c according to the present exemplary embodiment, the array pitch of the lenses configuring the microlens array 104 differs from the array pitch of the switching optical antennas 10-1 to 10-12. In the optical scanning device 100c, the array pitch of the lenses configuring the microlens array 104 is greater that the array pitch of the switching optical antennas 10-1 to 10-12, enabling radiation of output light Pout as illustrated in FIG. 6B.

As described above, according to the optical scanning devices according to each exemplary embodiment described above, the array pitch of the switching optical antennas configuring the switching optical antenna array can be reduced, enabling two-dimensional scanning of a unimodal light beam in which sidelobes are suppressed from occurring.

Fourth Exemplary Embodiment

Switching optical antennas 10a and 10b according to the present exemplary embodiment are described with reference to FIG. 7A and FIG. 7B. The switching optical antennas 10a and 10b have a form in which a polarized light separating diffraction grating is employed instead of the diffraction grating 12 in the switching optical antenna 10 according to the exemplary embodiment described above. The switching optical antenna 10a is a switching optical antenna for transmitting and the switching optical antenna 10b is a switching optical antenna for receiving.

First, the switching optical antenna 10a will be described with reference to FIG. 7A. The switching optical antenna 10a is input with p-polarized input light Pip and s-polarized input light Pis, and these are multiplexed and emitted as transmission light Pt. As illustrated in FIG. 7A, the switching optical antenna 10a is configured including a polarized light separating diffraction grating 22, a ring waveguide 16, waveguides 20-1 and 20-2, and directional couplers 14-1, 14-2, 14-3, and 14-4.

The waveguide 20-1 is an optical waveguide to which p-polarized input light Pip is introduced, and the waveguide 20-2 is an optical waveguide to which s-polarized input light Pis is introduced. The waveguide 20-1 is coupled with the ring waveguide 16 by the directional coupler 14-2, and the waveguide 20-2 is coupled with the ring waveguide 16 by the directional coupler 14-4. Note that although a heater is disposed at a location above the ring waveguide, this is omitted from illustration in FIG. 7A.

As illustrated in FIG. 7A, input lights Pip and Pis that meet a predetermined resonance condition are multiplexed by adjusting the amount of heat applied to the ring waveguide 16 by the non-illustrated heater, and are emitted as transmission light Pt from the polarized light separating diffraction grating 22. Namely, when the non-illustrated heater causes the predetermined resonance condition to be met, input light Pip that has propagated through the waveguide 20-1 is input to the polarized light separating diffraction grating 22 via the directional couplers 14-2 and 14-3. Further, when the non-illustrated heater causes the predetermined resonance condition to be met, input light Pis that has propagated through the waveguide 20-2 is input to the polarized light separating diffraction grating 22 via the directional couplers 14-4 and 14-1. Input light Pip and Pis input to the polarized light separating diffraction grating 22 are multiplexed and emitted from the polarized light separating diffraction grating 22 as transmission light Pt.

Next, the switching optical antenna 10b will be described with reference to FIG. 7B. As illustrated in FIG. 7B, the switching optical antenna 10b is configured including the polarized light separating diffraction grating 22, the ring waveguide 16, the waveguides 20-1 and 20-2, and the directional couplers 14-1, 14-2, 14-3, and 14-4. Further, although a heater is disposed at a location above the ring waveguide, this is omitted from illustration in FIG. 7B. Namely, the physical configuration is the same as the switching optical antenna 10a, but the propagation direction of light is different.

The switching optical antenna 10b uses the polarized light separating diffraction grating 22 to receive reception light Pr that is multiplexed p-polarized light and s-polarized light. The reception light Pr received by the polarized light separating diffraction grating 22 is separated into p-polarized light and s-polarized light by the polarized light separating diffraction grating. P-polarized output light Pop is emitted from the waveguide 20-1 via the directional couplers 14-3 and 14-2 when the predetermined resonance condition is satisfied by the non-illustrated heater. On the other hand, s-polarized output light Pos is emitted from the waveguide 20-2 via the directional couplers 14-1 and 14-4 when the predetermined resonance condition is satisfied by the non-illustrated heater.

Fifth Exemplary Embodiment

A switching optical antenna array 50a according to the present exemplary embodiment will be described with reference to FIG. 8. The switching optical antenna array 50a is configured by disposing plural of the switching optical antenna 10b (12 units in the example illustrated in FIG. 8) according to the exemplary embodiment described above in an array arrangement, and the switching optical antenna array 50a functions as an optical receiver.

Figure 8:
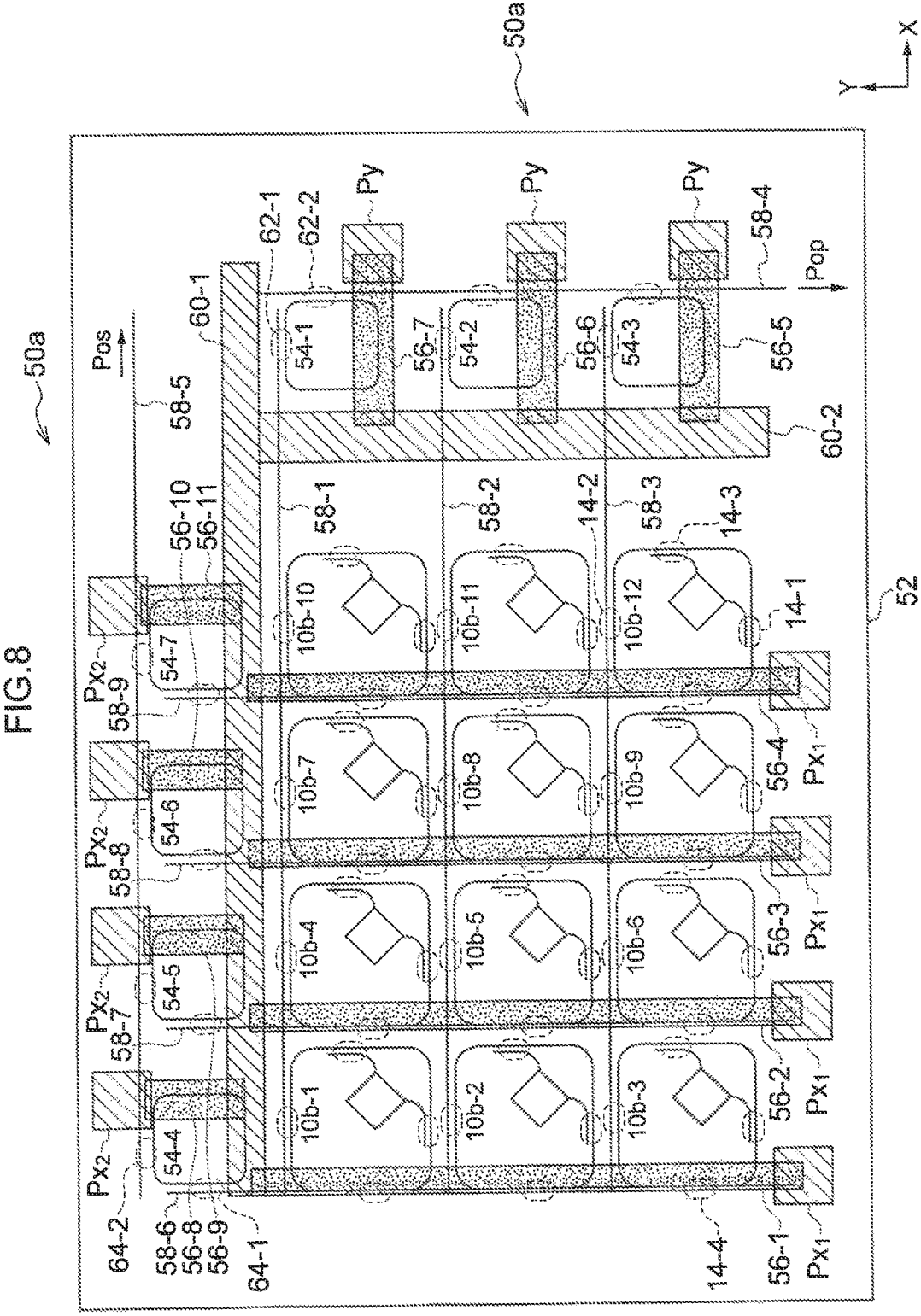
FIG. 8 is a plan view illustrating an example of a configuration of a switching optical antenna array according to a fifth exemplary embodiment.

As illustrated in FIG. 8, the switching optical antenna array 50a is configured including switching optical antennas 10b-1, 10b-2, 10b-3, 10b-4, 10b-5, 10b-6, 10b-7, 10b-8, 10b-9, 10b-10, 10b-11, and 10b-12 that are all switching optical antennas 10b, ring waveguides 54-1, 54-2, 54-3, 54-4, 54-5, 54-6, and 54-7, heaters 56-1, 56-2, 56-3, 56-4, 56-5, 56-6, 56-7, 56-8, 56-9, 56-10, and 56-11, waveguides 58-1, 58-2, 58-3, 58-4, 58-5, 58-6, 58-7, 58-8, and 58-9, wirings 60-1 and 60-2, directional couplers 62-1, 62-2, 64-1, and 64-2, and pads Px1, Px2, and Py. Each configuration site configuring the switching optical antenna array 50a above is integrated on a substrate 52 using optical waveguide technology.

In FIG. 8, configuration that functions the same as in the switching optical antenna array 50 illustrated in FIG. 2 is allocated the same reference numeral. Namely, in FIG. 8, the ring waveguides 54-1, 54-2, and 54-3, the heaters 56-1, 56-2, 56-3, 56-4, 56-5, 56-6, and 56-7, the waveguides 58-1, 58-2, 58-3, and 58-4, and the wirings 60-1 and 60-2 control the row direction and column direction of the switching optical antenna array 50a and control reception and non-reception by each switching optical antenna 10a. Namely an X light multiplexer that controls the propagation direction of light in the row direction is configured by the ring waveguides 54-1, 54-2, and 54-3, and a Y light multiplexer that controls the propagation direction of light in the column direction is configured by the heaters 56-1, 56-2, 56-3, and 56-4.

In the switching optical antenna array 50a, the ring waveguides 54-4, 54-5, 54-6, and 54-7, the waveguide 58-5, the directional couplers 64-1 and 64-2, and the pad. Px2 have been further added to the switching optical antenna array 50 illustrated in FIG. 2. In the switching optical antenna array 50a, reception light Pr that includes a p-polarized component and an s-polarized component is radiated as one to the switching optical antennas 10b-1, 10b-2, 10b-3, 10b-4, 10b-5, 10b-6, 10b-7, 10b-8, 10b-9, 10b-10, 10b-11, and 10b-12. Due to being configured in the manner described above, the switching optical antenna array 50a enables reception control of the reception light Pr to be controlled by separating the p-polarized component and the s-polarized component.

Next, operations of the switching optical antenna array 50a will be described. For example, consider a case in which p-polarized light and s-polarized light included in reception light Pr incident to the switching optical antenna 10b-1 are both output. In the switching optical antenna array 50a, one end of the waveguide 58-4 is an output end for output light Pop of the p-polarized component and one end of the waveguide 58-5 is an output end for output light Pos of the s-polarized component. Accordingly, first, a pathway through the waveguide 58-1 is selected using the heater 56-7, and a pathway through the waveguide 58-6 is selected using the heater 56-8.

With regard to the p-polarized component, adjusting the heater 56-1 causes the waveguide 58-1 to couple through the directional couplers 14-3 and 14-2 (see FIG. 7B) of the switching optical antenna 10b-1. The p-polarized component propagated through the waveguide 58-1 is transferred to the waveguide 58-4 via the directional coupler 62-1, the ring waveguide 54-1, and the directional coupler 62-2, and is output as output light Pop. On the other hand, with regard to the s-polarized component, adjusting the heater 56-1 causes the waveguide 58-6 to couple through the directional couplers 14-1 and 14-4 (see FIG. 7B) of the switching optical antenna 10b-1. The s-polarized component propagated through the waveguide 58-6 is transferred to the waveguide 58-5 through the directional coupler 64-1, the ring waveguide 54-4, and the directional coupler 64-2, and is output as output light Pos.

As described above, the switching optical antenna array according to the present exemplary embodiment enables separation of polarization of light from the outside word, and enables changing of the heading of light traveling around the waveguide, which is closed by the orientation of the directional coupler.

When the spacing of elements that radiate light (a diffraction grating) is more than ½ the wavelength of carried light, such as in the phased array antenna described by Non-Patent Document 1, this causes sidelobes known as grating lobes in many cases. On the other hand, when considering, for example, a distance sensor, this being an example of apparatus that employs a semiconductor laser, wavelengths of approximately 2 µm in a region spanning from infrared to visible are employed. In such cases, the element spacing is set at no greater than 1 µm, which is half the wavelength, and propagation without coupling of waveguide modes is not possible in waveguides configured by materials having a refractive index of approximately 3, which is a commonplace refractive index. Namely, there is an issue in the related technology that mode coupling occurs close to the waveguide, and grating lobes are generated at a distance from the waveguide.

The present invention has been arrived at in consideration of the above issue, and an object is to provide a switching optical antenna, a switching optical antenna array, and an optical scanning device in which two-dimensional arrangement and high-density arrangement are possible while reducing the scale of optical lines and electrical wiring.

A switching optical antenna of a first aspect includes a waveguide including a light input end and a light output end, a ring waveguide coupled with the waveguide through a first directional coupler, a diffraction grating that is disposed within the ring waveguide and that is coupled with the ring waveguide through a second directional coupler, and a refractive index adjusting section that changes a refractive index of at least a portion of the ring waveguide.

In order to achieve the above object, a switching optical antenna array of a second aspect includes a scanning array in which plural scanning array units are arrayed in a second direction that intersects with a first direction. Each scanning array unit includes plural of the switching optical antenna of the first aspect arrayed in the first direction through a first scanning waveguide configured by the waveguides of the switching optical antennas connected to each other, a first scanning ring waveguide coupled with the first scanning waveguide by a third directional coupler, and a first scanning refractive index adjusting section that changes a refractive index of at least a portion of the first scanning ring waveguide. Further, the switching optical antenna array of the second aspect includes plural second scanning refractive index adjusting sections configured by the refractive index adjusting sections of plural of the scanning array units connected to each other in the second direction, and a second scanning waveguide coupled with each of plural of the first scanning ring waveguides through respective fourth directional couplers.

Further, a third aspect of the present invention is the second aspect of the present invention, wherein each of the plural diffraction gratings is a polarized light separating diffraction grating. Further, the third aspect of the present invention further includes: plural third scanning waveguides that are coupled with each ring waveguide of plural of the switching optical antennas, which are arrayed in the second direction, through respective fifth directional couplers; plural second scanning ring waveguides that are respectively coupled with the plural third scanning waveguides through respective sixth directional couplers; and a fourth scanning waveguide that is coupled with each of the plural second scanning ring waveguides through respective seventh directional couplers.

In order to achieve the above object, an optical scanning device of a fourth aspect includes the switching optical antenna array of the second aspect or the third aspect; and a lens provided above plural of the switching optical antennas.

Further, a fifth aspect of the present invention is the fourth aspect of the present invention, wherein the lens is a microlens array that includes plural microlenses disposed so as to respectively correspond to plural of the switching optical antennas.

Further, a sixth aspect of the present invention is the fifth aspect of the present invention, wherein an array pitch of the plural microlenses is greater than an array pitch of plural of the switching optical antennas.

Advantageous Effects

According to the present invention, an advantageous effect is exhibited of enabling a switching optical antenna, a switching optical antenna array, and an optical scanning device to be provided that are capable of two-dimensional arrangement and high-density arrangement while reducing the scale of optical lines and electrical wiring.

What is claimed is:
1. A switching optical antenna array comprising:
  a scanning array in which a plurality of scanning array units are arrayed in a second direction that intersects with a first direction, each scanning array unit including:
    a plurality of switching optical antennas, arrayed in the first direction through a first scanning waveguide configured by waveguides of the plurality of switching optical antennas connected to each other, each switching optical antenna including:
      a waveguide including a light input end and a light output end;
      a ring waveguide coupled with the waveguide through a first directional coupler;
      a diffraction grating that is disposed within the ring waveguide and that is coupled with the ring waveguide through a second directional coupler; and
      a refractive index adjusting section that changes a refractive index of at least a portion of the ring waveguide;
    a first scanning ring waveguide coupled with the first scanning waveguide by a third directional coupler; and
    a first scanning refractive index adjusting section that changes a refractive index of at least a portion of the first scanning ring waveguide;
  a plurality of second scanning refractive index adjusting sections configured by refractive index adjusting sections of at least some of the plurality of scanning array units, which are connected to each other in the second direction; and
  a second scanning waveguide coupled with each of a plurality of the first scanning ring waveguides through respective fourth directional couplers.
2. The switching optical antenna array of claim 1, wherein:
  each of the diffraction gratings is a polarized light separating diffraction grating; and
  the switching optical antenna array further comprises:

a plurality of third scanning waveguides that are each coupled with each ring waveguide of the plurality of switching optical antennas, which are arrayed in the second direction, through respective fifth directional couplers;

a plurality of second scanning ring waveguides that are respectively coupled with the plurality of third scanning waveguides through respective sixth directional couplers; and a fourth scanning waveguide that is coupled with each of the plurality of second scanning ring waveguides through respective seventh directional couplers.

3. An optical scanning device comprising:

the switching optical antenna array of claim 1; and a lens provided above at least some of the plurality of switching optical antennas.

4. The optical scanning device of claim 3, wherein the lens includes a microlens array that includes a plurality of microlenses disposed so as to respectively correspond to the plurality of switching optical antennas.

5. The optical scanning device of claim 4, wherein an array pitch of the plurality of microlenses is greater than an array pitch of the plurality of switching optical antennas.

* * * * *